UNITED STATES PATENT OFFICE.

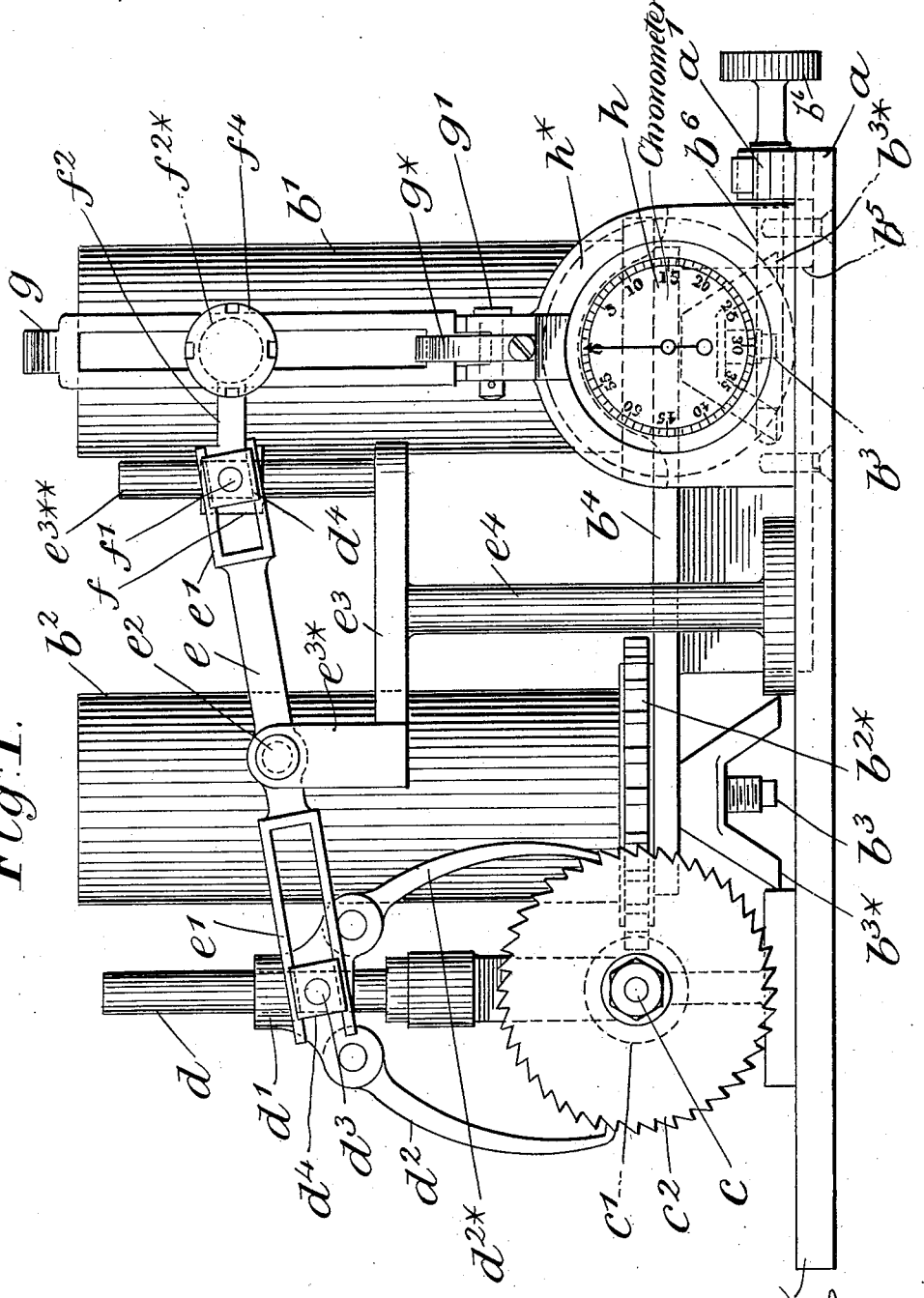

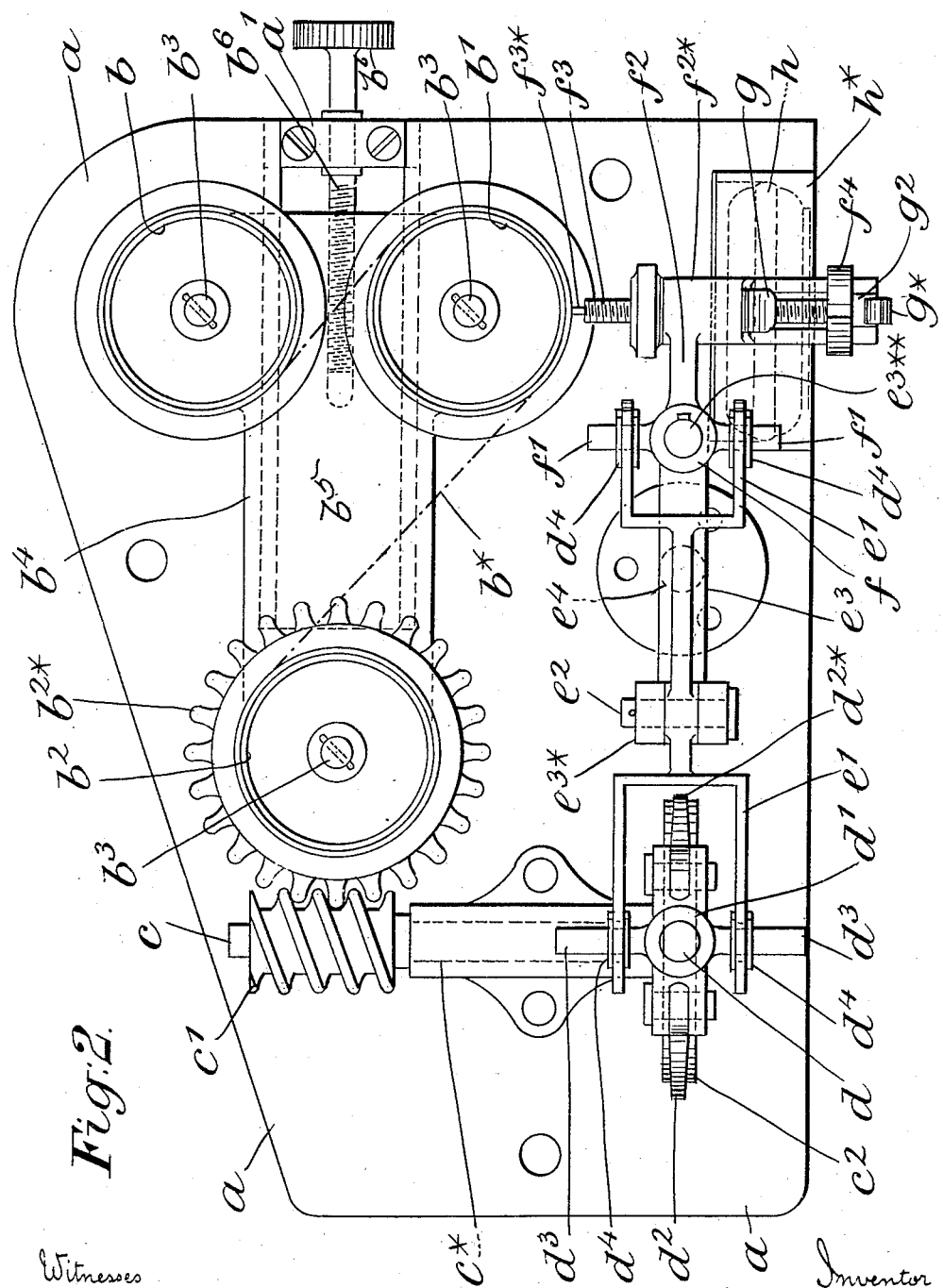

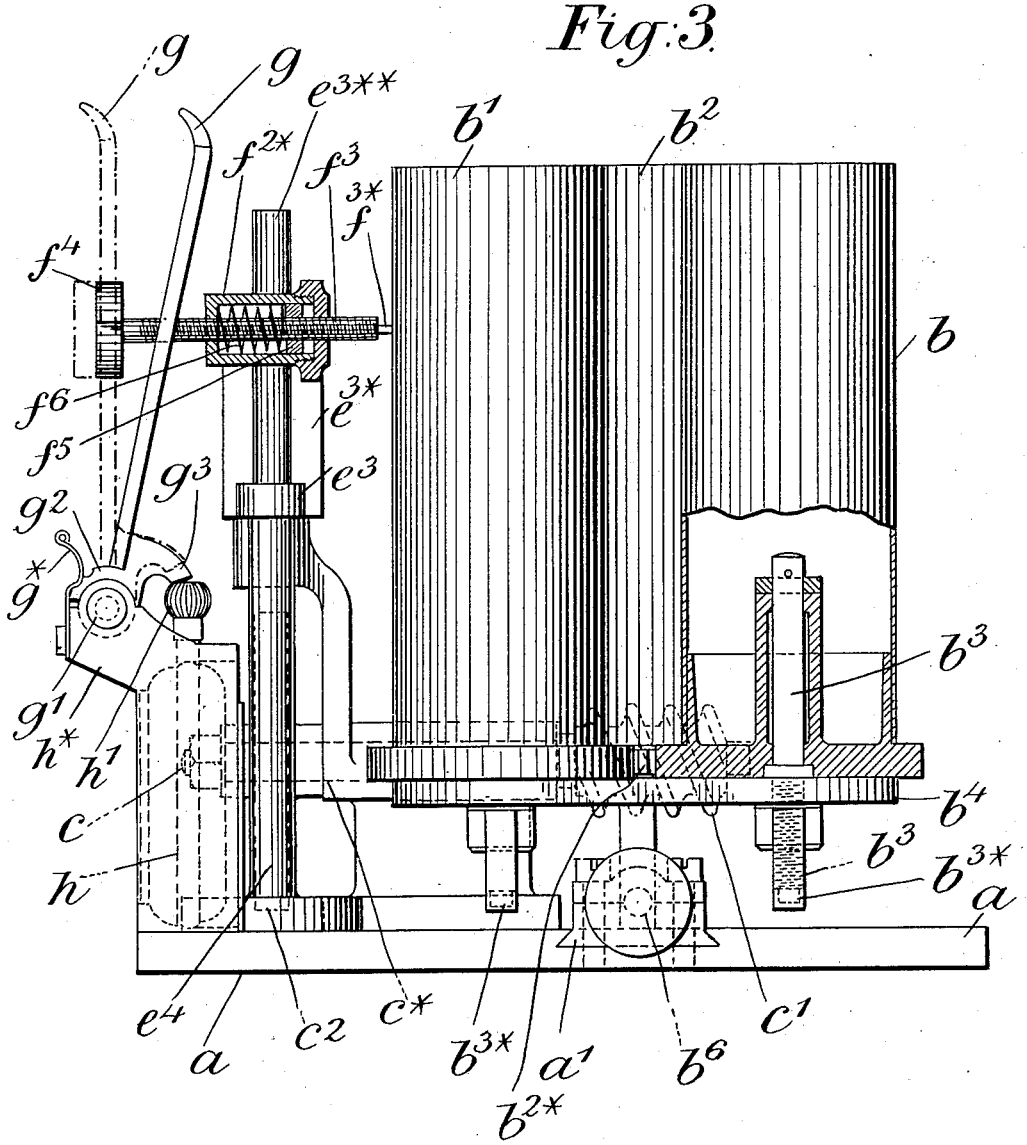

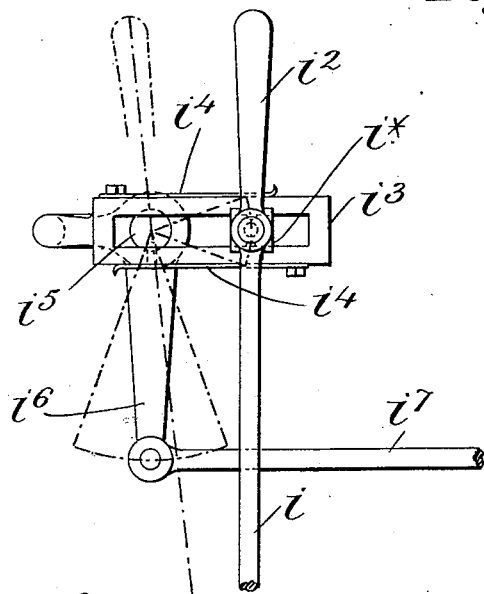
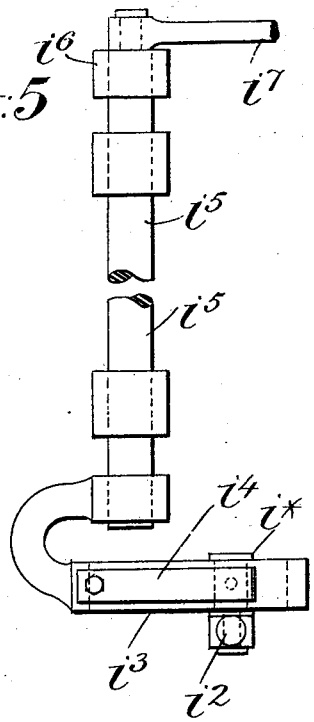
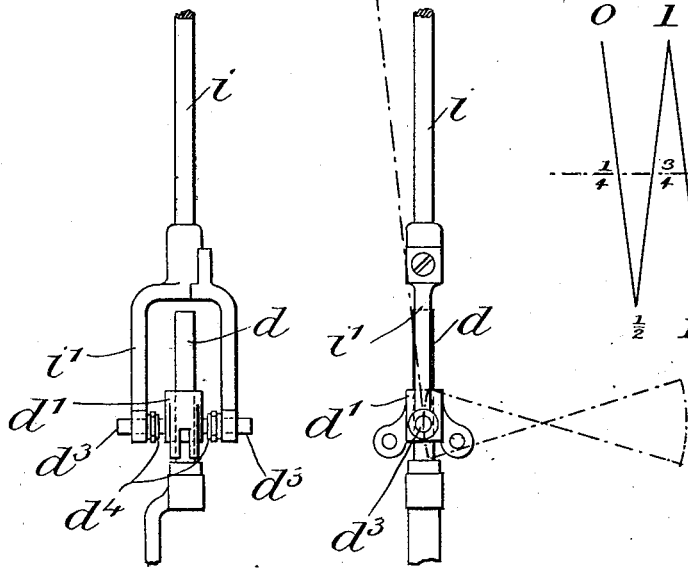
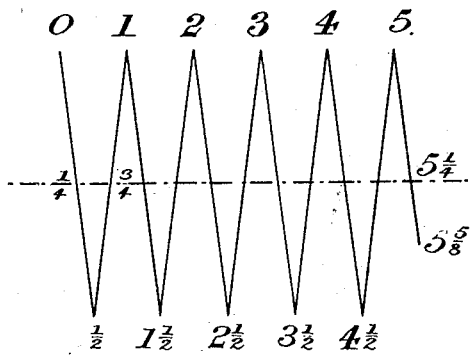

JOSEPH PROKOFIEFF, OF ST. PETERSBURG, RUSSIA.

SPEED-RECORDER.

SPECIFICATION forming part of Letters Patent No. 549,210, dated November 5, 1895.

Application filed May 1, 1895. Serial No. 547,779. (No model.)

*To all whom it may concern:*

Be it known that I, JOSEPH PROKOFIEFF, marine engineer, a subject of the Emperor of Russia, residing at Wassilieffsky Ostrov, 15 Line, house 8, St. Petersburg, in the Empire of Russia, have invented certain new and useful Improvements in Speed-Indicators, of which the following is a specification.

The invention relates to improvements in speed indicators or recorders, and has for its object to obtain a simple and reliable instrument by the aid of which the precise number of rotations made in a given time by a steam or other engine or machine can be graphically recorded by a diagram upon a paper strip, which can be preserved for future reference after the manner of a steam-engine diagram, so that at any time reference may be had thereto for a precise indication of the number of rotations of the engine recorded at a given time, and which is especially useful in the case of official trials.

In carrying the invention into effect three drums are employed, the first of which carries a store of paper in the form of a strip or band, the second of which acts as a guide-drum for the paper strip, while the third drum receives rotary motion, as hereinafter described, and gradually draws the paper off the first drum and coils it upon itself. The three drums are loosely mounted upon spindles fixed with a movable slide, which may be traversed by means of an adjusting-screw, for the purpose hereinafter described, and the driven drum has fixed therewith a worm-wheel, which engages a worm upon the principal driven shaft of the instrument, so that while the mechanism is in motion the paper is gradually drawn off the store-drum around the guide-drum and wound onto the driven drum, and in order to adjust the worm-wheel with relation to the worm or to throw it into or out of gear therewith, the slide is provided with the traversing-screw hereinbefore referred to, by rotating which the slide may be traversed in either direction for these purposes.

Upon the main shaft of the instrument is fixed a ratchet-wheel, and upon a vertical shaft or spindle adjacent thereto is mounted a slide, which carries a clawker or pull-pawl, which engages the ratchet-wheel upon one side of its axis and a driver which engages the same upon the other side thereof, so that upon a reciprocating motion being imparted to the slide a rotary motion will be given to the ratchet-wheel and thus to the principal shaft. To the driven slide is loosely connected one end of a lever, which is mounted upon an axis of motion carried by a bracket from a standard fixed with the base-plate, and the opposite end of this lever loosely engages a slide mounted upon a stud carried by the bracket, and which slide is formed with an arm or offset carrying a boss through which passes a movable pencil, which at the times desired impinges upon the paper passing around the guide-drum, so that as the principal slide carrying the clawker or pull-pawl and driver is reciprocated, a corresponding movement will be given to the pencil-slide and the pencil will receive a given rectilinear movement, thus marking upon the traveling paper the desired diagram.

The pencil is normally held in contact with the traveling paper by means of a light spring, while in order to remove the same out of contact therewith at the times desired the pencil-holder is provided with a button upon its outer end, and an arm or lever mounted upon an axis of motion is employed and which is slotted to embrace and allow the free movement of the pencil in one position, while when it is desired to take the pencil off the traveling paper the arm is moved into its other position, when it will engage the button or enlargement and withdraw the pencil, a spring stop or detent acting in conjunction with notches or recesses formed in a boss of the lever adjacent to its axis, holding the lever in either of its two positions.

The passage of time is calculated or indicated by means of a pocket-chronometer, which normally is stopped, but it may be set in motion by depressing the stem thereof, and in order to automatically actuate the stem at the times desired the lever or arm operating the pencil is at its lower end furnished with an offset, which, in that position of the arm or lever which permits the pencil to impinge upon the traveling paper, depresses the same and sets the chronometer in action, while in the opposite position of the lever—that is to say, when the pencil is withdrawn from the traveling paper—the offset releases the same, thus causing the chronometer to stop.

In order that the said invention may be more clearly understood and readily carried into effect, I will proceed, aided by the accompanying drawings, more fully to describe the same.

In the drawings, Figure 1 is a front elevation of an instrument constructed according to the present invention. Fig. 2 is a plan thereof. Fig. 3 is a side elevation thereof partly in section. Fig. 4 is a face view representing means employed to convey the motion of an engine to the slide. Fig. 5 is a plan thereof. Fig. 6 is a view of part thereof taken at right angles to Fig. 4. Fig. 7 illustrates to an enlarged scale the diagram marked by the pencil upon the traveling paper strip.

In the several figures, in which the same or like parts are indicated by the same letters of reference, Figs. 4, 5, and 6 are drawn to a somewhat reduced scale, while Fig. 7 is enlarged as compared with the other figures of the drawings.

$a$ represents the base-plate of the device.

$b$ represents the drum upon which the strip of paper $b^*$ is stored.

$b'$ represents the guide-drum, while $b^2$ represents the driven drum onto which the paper strip is wound, as hereinafter described.

Each of the three drums $b$ $b'$ $b^2$ is loosely mounted upon a spindle $b^3$, removably fixed in a sliding table $b^4$ by means of a fly or wing nut $b^{3*}$, screwing onto the lower end of the axle $b^3$, and the table $b^4$ is formed with a slide $b^5$, dovetailed to fit a corresponding groove formed in the base plate $a$, while the slide $b^5$ and consequently the table $b^4$ and the three drums $b$ $b'$ $b^2$ are adapted to be traversed, for the purpose hereinafter described, by means of an adjusting-screw $b^6$, mounted with capability of rotation in a bearing $a'$, carried by the base plate $a$ and engaging a tapped hole in the slide $b^5$.

The driven drum $b^2$ has fixed therewith a worm-wheel $b^{2*}$, which engages a worm $c'$, fixed upon the principal driven shaft $c$, which is mounted with capability of rotation in a bearing $c^*$, carried by a bracket fixed with the base plate $a$, so that while the mechanism is in motion the paper $b^*$ is gradually drawn off the store-drum $b$ around the guide-drum $b'$ and wound onto the driven drum $b^2$, and in order to adjust the worm-wheel $b^{2*}$ with relation to the worm $c'$, or to throw it into or out of gear therewith, the slide $b^5$ is provided with the traversing-screw $b^6$, as hereinbefore described, by rotating which the slide $b^5$, and therefore the table $b^4$, may be traversed in either direction for these purposes.

Upon the main shaft $c$ of the mechanism is fixed a ratchet-wheel $c^2$, and upon a vertical shaft or spindle $d$ adjacent thereto is mounted, with capability of vertical reciprocating movement, a slide $d'$, which carries a pull-pawl or clawker $d^2$, which engages the ratchet-wheel $c^2$ upon one side of the axis thereof, and a driver or push-pawl $d^{2*}$, which engages the same upon the other side thereof, so that upon a reciprocating motion being imparted to the slide $d'$ a rotary motion will be given to the ratchet-wheel $c^2$, and thus to the principal shaft $c$.

The reciprocating slide $d'$ has fixed therewith two horizontal short shafts or studs $d^3$, constituting a kind of cross-head upon which are loosely mounted two blocks $d^4$, which are loosely engaged by the slotted limbs of a fork $e'$, fixed with a lever $e$, mounted upon an axis of motion $e^2$, carried by a bracket $e^{3*}$ from a table $e^3$, supported upon a standard $e^4$, fixed with the base plate $a$. The opposite end of the lever $e$ is also provided with a slotted fork $e'$, which engages blocks $d^4$, loosely mounted upon a cross-head $f'$, fixed with a slide $f$, mounted with capability of reciprocating vertically upon a stud $e^{3**}$, fixed with the table $e^3$, and the slide $f$ is provided with an arm or offset $f^2$, carrying a hollow boss $f^{2*}$, forming a spring box through which passes a holder $f^3$ for a pencil $f^{3*}$, which latter at the times desired impinges upon the paper $b^*$, passing around the guide-roller $b'$, so that as the principal slide $d'$, carrying the clawker and driver $d^2$ $d^{2*}$, is reciprocated a corresponding movement will be given to the pencil-slide $f$, and the pencil $f^{3*}$ will be given a rectilinear movement transversely of the traveling paper band $b^*$, thus marking thereon the desired diagram.

The pencil $f^{3*}$ is normally held in contact with the traveling paper $b^*$ by means of a light spring $f^6$ contained within the box $f^{2*}$ and acting upon a piston or nut $f^5$, through which the threaded holder $f^3$ adjustably screws, and which construction is well understood and needs no more particular description here, while in order to remove the pencil $f^{3*}$ out of contact with the paper $b^*$ at the times desired the pencil-holder $f^3$ is upon its outer end provided with a button or enlargement $f^4$, and in connection therewith is employed an arm or lever $g$, mounted upon an axis of motion $g'$, carried by a bracket $h^*$ from the base-plate $a$ and slotted to loosely embrace the pencil-holder $f^3$, so that when the arm or lever $g$ is placed in the position indicated by the full lines in Fig. 3 the pencil $f^{3*}$ is free to impinge upon the traveling paper $b^*$, while when the lever $g$ is moved to its other position (indicated by the dotted lines in Fig. 3) it will act upon the button-head or enlargement $f^4$ and withdraw the pencil $f^{3*}$ from the paper $b^*$.

The lever $g$ is held against accidental movement in either of its two positions by means of a spring stop or detent $g^*$, which acts in conjunction with notches or recesses formed in a boss $g^2$, fixed with the lower end of the lever $g$.

The passage of time is calculated or indicated by means of a pocket-chronometer $h$, which is held in position by means of the bracket $h^*$, which is shaped to form a holder therefor, and the chronometer $h$, which normally is stopped, is adapted to be set in motion by depressing the stem $h'$ thereof, and in order to automatically actuate the stem $h'$ at the times desired the boss $g^2$ of the lever or arm $g$, operating the pencil-holder $f^3$, has formed thereon a finger or offset $g^3$, which in that position of the lever indicated by the full lines in Fig. 3, which permits the pencil $f^{3*}$ to impinge upon the traveling paper $b^*$, depresses the stem $h'$ of the chronometer $h$ and sets the latter in action, while in the opposite position of the lever $g$, and which is indicated by the dotted lines in Fig. 3—that is to say, when the pencil $f^{3*}$ is withdrawn from the traveling paper $b^*$—the finger or offset $g^3$ releases the stem $h'$, which is lifted by any suitable spring, (not shown,) thus causing the chronometer $h$ to stop, and it will be understood that the chronometer must be so constructed that it has the simple action hereinbefore referred to.

The instrument may receive motion from the steam or other engine with which it is to be connected in any suitable manner; but the following arrangement of parts, and which is represented separately at Figs. 4, 5, and 6, has been found to answer well in practice.

This device is for the sake of clearness not shown in connection with the other figures of the drawings. Loosely connected with the studs or cross-head $d^3$ of the slide $d'$ is the forked end $i'$ of a link or connecting-rod $i$, which at its other end is pivotally connected with a block $i^*$, mounted with capability of sliding in the slot of a link $i^3$, and the link $i^3$ is fixed upon a shaft $i^5$, which receives a rocking motion through a lever or offset $i^6$ fixed therewith and a connecting-rod $i^7$ pivotally connected therewith, and with any suitable reciprocating part of the engine, such as the cross-head of a piston rod. By this arrangement of parts the shaft $i^5$ will receive a rocking motion, imparting an oscillating motion to the link $i^3$, and through the link or connecting-rod $i$, the required vertical reciprocating motion to the slide $d'$. The link or connecting-rod $i$ is provided with a handle $i^2$, by the aid of which it may be moved along the slot of the link $i^3$ into such a position that it will be coincident with the shaft $i^5$, as indicated by the dotted lines in Fig. 4, when the oscillation of the link $i^3$ will not impart any movement to the link or connecting-rod $i$, and the instrument may thus be put out of action, while it may be as readily restarted by moving the link $i$ by the handle $i^2$ into the position shown by the full lines in Fig. 4.

In order to prevent accidental movement of the link or connecting-rod $i$ with relation to the link $i^3$, the sliding block $i^*$ is provided upon both its upper and lower sides with a notch or recess with which, in each position of the link or connecting-rod $i$, engages a detent consisting of a rounded stud carried by a spring $i^4$.

The action of the indicator may be described as follows: A vertical reciprocating motion is imparted to the slide $d'$ by the link or connecting-rod $i$, causing the clawker and driver $d^2$ $d^{2*}$ to give rotary motion through the ratchet-wheel $c^2$ to the principal shaft $c$, and through the worm $c'$ and worm-wheel $b^{2*}$ to the drum $b^2$, which draws the paper strip $b^*$ from off the store-drum $b$ around the guide-drum $b'$ in contact with the pencil $f^{3*}$, and the principal slide $d'$ at the same time gives a vertical rectilinear motion through the lever $e$ and slide $f$ to the pencil-holder $f^3$, and the pencil in its traverse marks upon the traveling paper strip $b^*$ a diagram, such as that represented at Fig. 7.

In the diagram Fig. 7 each angle $0\frac{1}{2}1, 1 1\frac{1}{2} 2, 2 2\frac{1}{2} 3$, and so on, corresponds with one complete rotation of the engine-crank, and the portions $\frac{1}{4} \frac{1}{2} \frac{3}{4}$ of the sides of each angle correspond with the same sub-divisions of one rotation of the engine-crank, and by comparing the diagram with a given period of time, as shown by the chronometer, the speed of the engine may be arrived at.

Having now particularly described and ascertained the nature of the said invention and in what manner the same is to be performed, I declare that what I claim is—

1. In a speed indicator the combination of a traveling strip or band of paper, a driven drum for traversing the paper, a pencil adapted to impinge upon the paper, a slide adapted to be reciprocated by connection with a moving part of the engine a rotative shaft, a ratchet wheel fixed with the shaft, a clawker and a driver pivotally connected with the slide and engaging the ratchet wheel upon opposite sides, a worm fixed with the shaft, a worm wheel fixed with the paper drum and engaging the worm and means for giving a rectilinear reciprocating movement to the pencil substantially as herein shown and described.

2. In a speed indicator in which a pencil impinges upon a traveling strip or band of paper the combination of a slotted arm or lever embracing the pencil holder and acting upon an enlargement thereof and holding the pencil out of contact with the traveling paper band at the times desired, and means for retaining the arm or lever in the desired position substantially as herein shown and described and for the purpose stated.

3. In combination with the supporting plate, a shaft carrying a worm and ratchet wheel, a rocking arm supported from the base plate and operating a set of pawls at one end to impart movement to the ratchet wheel, a vertically reciprocating slide operated from the other end of said arm, connection from the arm to a working part of the engine, a sliding plate having a dovetailed connection with the base, drums carried by said base for the paper slip, a worm wheel carried by one of the drums, and means for moving said table to throw said worm wheel into and out of gear with the worm.

4. In a speed indicator or recorder, the combination with the paper carrying drums with means for operating them, of the pencil carrier with means for reciprocating it, the pencil carried by said carrier, the chronometer normally out of action, and the operating lever pivotally supported having its arms arranged to contact with the pencil carrier and the chronometer, means for holding the lever in either position, said lever serving to simultaneously throw the pencil against the paper and start the chronometer, substantially as described.

5. In a speed indicator or recorder, the combination with the paper rolls with operating means, a pencil carrier comprising the box $f^{2*}$ with the pencil holder sliding therein, the guide for the box, means for moving the box with the pencil on the guide, a lever for moving the pencil holder along the box, and a chronometer arranged to be set in motion by contact with the said lever, substantially as described.

6. In a speed indicator for engines, the combination with the traveling strip of paper, the driven drum for traversing the paper, a reciprocating slide having operating connections to a moving part of the engine, means for converting the reciprocating motion of the slide into rotary motion and conveying it to the driven drum, a rocking lever having one end loosely connected with the slide, and a pencil adapted to impinge upon the paper and having connections to the other end of said rocking lever whereby it receives a rectilinear reciprocating motion, substantially as described.

7. In a speed indicator in which a pencil impinges upon a traveling strip of paper, the combination with the base plate, the shaft journaled thereon and adapted to be operated from the engine, the worm on said shaft, the sliding table or platform, the three spindles fixed thereon, storage, guide and driven drums journaled respectively on said spindles, a worm wheel on the driven drum arranged to engage the worm on the shaft, and means for moving the table toward and from the shaft at right angles to the same to engage and disengage the worm wheel with the worm, substantially as described.

JOSEPH PROKOFIEFF.

Witnesses:
RUDOLF WETZER,
NICOLAS TVANOFF.